(No Model.)
P. W. TILLINGHAST.
BICYCLE.
No. 444,258. Patented Jan. 6, 1891.
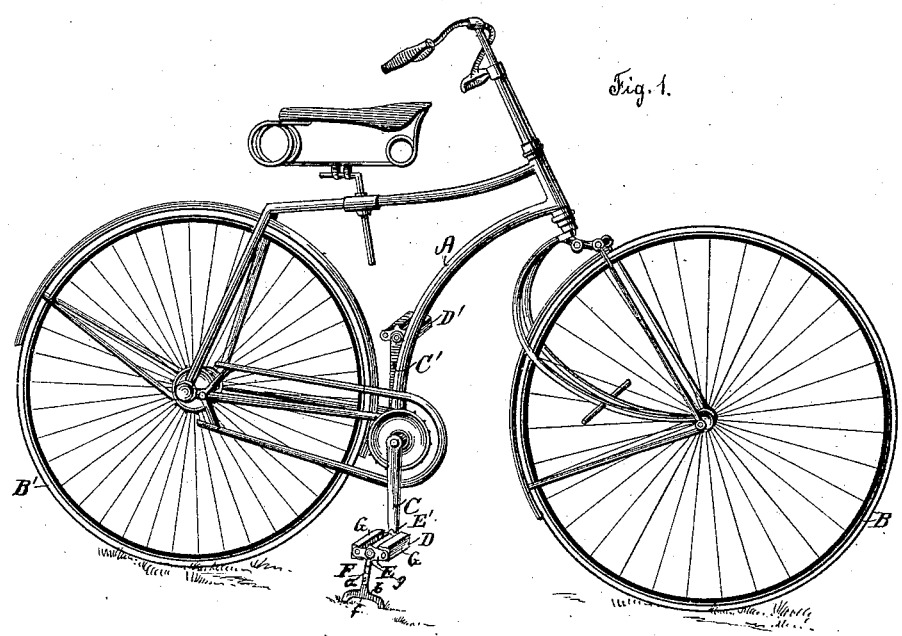
Fig. 1.
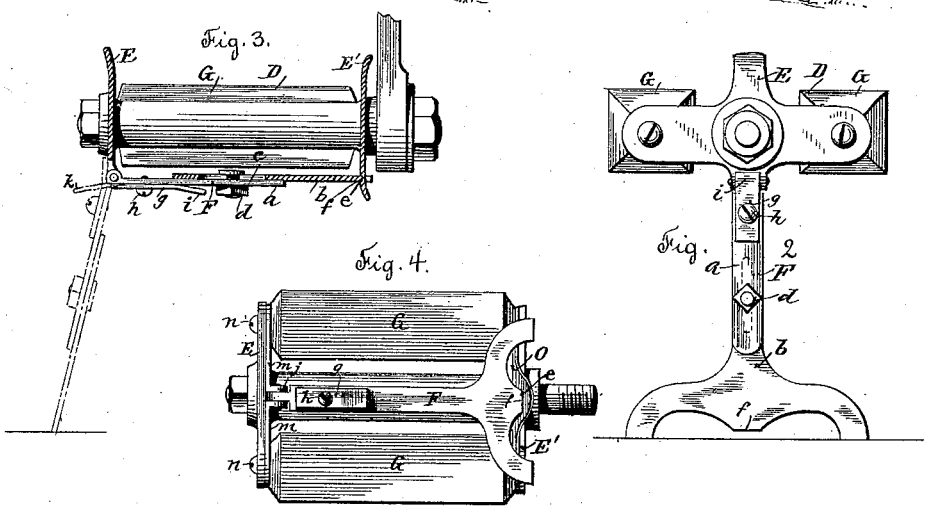
Fig. 3. Fig. 2.
Fig. 4.
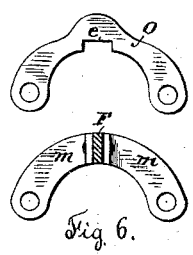
Fig. 5.
Fig. 6.
Witnesses
Chas. F. Schmelz
John D. Lynch
Inventor
Pardon W. Tillinghast
By his Attorney
A. Scholfield

UNITED STATES PATENT OFFICE.

PARDON W. TILLINGHAST, OF PROVIDENCE, RHODE ISLAND.

BICYCLE.

SPECIFICATION forming part of Letters Patent No. 444,258, dated January 6, 1891.

Application filed September 24, 1890. Serial No. 366,026. (No model.)

*To all whom it may concern:*

Be it known that I, PARDON W. TILLINGHAST, a citizen of the United States, residing at Providence, in the State of Rhode Island, have invented a new and useful Improvement in Bicycles, of which the following is a specification.

The object of my invention is to provide the bicycle with a convenient brace or support, whereby the bicycle can be held to rest in an upright position when not in use; and my invention consists in a supporting-brace pivoted to the pedal and arranged for operation, as hereinafter fully set forth.

Figure 1 represents a perspective view of a bicycle provided with my improvement. Fig. 2 represents an end elevation of the pedal and a side elevation of the supporting-brace. Fig. 3 represents a sectional view of the pedal. Fig. 4 represents an under view of the pedal, showing a modification. Figs. 5 and 6 represent plan views of certain parts shown in Fig. 4.

In the accompanying drawings, A represents the frame of the bicycle; B B', the two wheels; C C, the cranks, and D D' the pedals.

To the under edge of the plate E, at the outer end of the pedal D, is pivoted the supporting-brace F, which may be either made in one piece, as shown in Fig. 4, or be made in two pieces, so as to be extensible, as shown in Figs. 2 and 3, in which the part $a$ is jointed to the plate E, and the part $b$, which is made spreading at its lower end, or forked, is provided with a slot $c$ and secured to the part $a$ by means of a bolt or screw $d$, so that the part $b$ will be made adjustable with the part $a$. The plate E' at the inner end of the pedal D is provided with a notch $e$, into which the end $f$ of the supporting-brace is made to spring and engage, as shown in Fig. 3, thus serving to hold the same in a horizontal position at the under side of the pedal until released therefrom for use in the position shown by the dotted lines.

In order to provide a suitable stop to prevent the further outward movement of the supporting-brace or a closing movement of the same, a button $g$ may be pivoted to the part $a$ at the screw $h$, so that when the button is turned upon its pivot to the position shown by the dotted lines the deflected end $i$ of the button $g$ will form the stop required.

Instead of the button $g$, the part $a$ may be extended outwardly beyond the joint $j$, as shown by the dotted line $k$; but by the employment of the button the undesirable projection of the end $k$ when the brace is folded into the notch $e$ will be avoided.

A modification showing the adaptation of my invention to the pedals of bicycles already constructed is shown in Fig. 4, in which the supporting-brace F is made in one piece and provided with the button $g$, the joint $j$ being formed by means of the joint-pieces $m$ $m$, which are held between the inner side of the plate E and the end of the rubbers G G by means of the screws $n$ $n$, and the spring-plate O is similarly held between the plate E' and the adjacent end of the said rubbers, the said spring-plate being provided with a notch $e$, into which the end $f$ of the supporting-brace is made to spring upon the movement of the said brace to a position parallel with the axis of the pedal. The lower end of the pivoted brace is made spreading or forked in order to provide an extended bearing upon the ground, and thus preventing the pedal from turning upon the crank-pin when the weight of the bicycle is brought upon the brace.

I claim as my invention—

1. In a bicycle, the combination, with the pedal, of a supporting-brace jointed thereto and adapted to be folded upon the pedal, substantially as described.

2. In a bicycle, the combination, with the pedal, of a supporting-brace jointed thereto and adapted to be folded upon the pedal and for adjustment in length, substantially as described.

3. In a bicycle, the combination, with the pedal, of a supporting-brace jointed thereto and adapted to be folded upon the pedal and provided with a spreading or forked end, substantially as described.

4. In a bicycle, the combination, with the pedal, of a supporting-brace jointed thereto and provided with a button which forms a stop against further outward movement when the brace is arranged for use, substantially as described.

5. In a bicycle, the combination, with the pedal, of the supporting-brace jointed thereto and provided with a button, which serves to prevent the folding movement of the brace when arranged for use, substantially as described.

6. In a bicycle, the combination, with the pedal provided with the removably-attached joint-plates, of the brace connected to the pedal by means of the said joint-plates and adapted for folding upon the pedal, substantially as described.

7. In a bicycle, the combination, with the pedal provided with the removably-attached joint-plates and the removably-attached catch-spring, of the brace connected to the pedal by means of the said joint-plates and adapted for folding upon the pedal, substantially as described.

8. In a bicycle, the combination, with the pedal provided with the removably-attached catch-spring, of the supporting-brace jointed to the pedal and adapted to be folded upon the same and held in its folded position by the catch-spring, substantially as described.

PARDON W. TILLINGHAST.

Witnesses:
SOCRATES SCHOLFIELD,
JOHN S. LYNCH.